US005706185A

United States Patent [19]

Toyama et al.

[11] Patent Number: 5,706,185

[45] Date of Patent: Jan. 6, 1998

[54] CONTROL APPARATUS FOR A LIGHTING SYSTEM OF A DISCHARGE LAMP USED IN VARIOUS TYPES OF VEHICLES

[75] Inventors: Koichi Toyama, Kariya; Koichi Kato, Chiryu; Kenji Aida, Kariya, all of Japan

[73] Assignee: Nippondenso Co., Ltd., Kariya, Japan

[21] Appl. No.: 655,897

[22] Filed: May 31, 1996

[30] Foreign Application Priority Data

Jun. 2, 1995 [JP] Japan .................................... 7-136752
Mar. 21, 1996 [JP] Japan .................................... 8-064776

[51] Int. Cl.[6] .................................................. H02M 3/335

[52] U.S. Cl. ............................................. 363/21; 315/127

[58] Field of Search ................................ 363/21, 79, 19; 315/307, 308, 127; 323/358

[56] References Cited

U.S. PATENT DOCUMENTS 5,151,631 9/1992 Oda et al. ................................ 315/127
5,295,036 3/1994 Yagi et al. ................................ 361/79

FOREIGN PATENT DOCUMENTS 0 567 108 A1 10/1993 European Pat. Off. .
0 647 085 A1 4/1995 European Pat. Off. .
2 646 538 11/1990 France .
2 667 213 3/1992 France .
41 32 299 4/1992 Germany .
43 22 139 1/1994 Germany .
2-159971 6/1990 Japan .

*Primary Examiner*—Peter S. Wong
*Assistant Examiner*—Rajnikant B. Patel
*Attorney, Agent, or Firm*—Cushman, Darby & Cushman IP Group of Pillsbury Madison & Sutro LLP

[57] ABSTRACT

DC/DC converter 31 boosts an output voltage of a battery 1 having a negative terminal grounded to a vehicle body, and supplies a boosted voltage to a discharge lamp 4 interposed between a positive output terminal and a negative output terminal of battery 1. A lamp current detecting resistance 35, connected in series with discharge lamp 4, detects a lamp current flowing through discharge lamp 4. Lamp voltage detecting resistances 33 and 34 detect a lamp voltage applied to discharge lamp 4. An electric power of DC/DC converter 31 is controlled by lamp power calculating circuit 36 and DC/DC converter drive circuit 37 based on the lamp current detected by lamp current detecting resistance 35 and the lamp voltage detected by lamp voltage detecting resistances 33 and 34. Discharge lamp 4 and lamp current detecting resistance 35 are connected at a connecting point "a" which is grounded. An excessive current flowing through lamp current detecting resistance 35 is detected to stop electric power supply to discharge lamp 4. Detection of the excessive current is inhibited until a predetermined period of time has elapsed after starting a lighting operation of discharge lamp 4.

22 Claims, 6 Drawing Sheets

CONTROL APPARATUS FOR A LIGHTING SYSTEM OF A DISCHARGE LAMP USED IN VARIOUS TYPES OF VEHICLES

BACKGROUND OF THE INVENTION

1. Field of the Invention

This invention relates to a control apparatus for a lighting system of a discharge lamp, such as a metal halide lamp, used in various types of vehicles, for example, preferably used as headlights for automotive vehicles.

Vehicles, in the present invention, represent a wide variety of vehicles comprising land vehicles such as automotive vehicles, aircrafts, marine vessels and the like.

2. Related Art

FIG. 6 shows a conventional control apparatus for a lighting system of a discharge lamp used in vehicles.

In FIG. 6, reference numeral I represents a battery having a negative terminal grounded to a vehicle body. Reference numeral 2 represents a lighting switch. Reference numeral 3 represents a discharge lamp control apparatus. Reference numeral 4 represents a discharge lamp, such as a metal halide lamp, which is preferably used as a headlight for vehicles.

Discharge lamp control apparatus 3 comprises a DC/DC converter 31 which boosts 12 Volt of battery 1 to 300–500 Volt and supplies the boosted DC power to discharge lamp 4, a high-voltage generating circuit 32 which supplies a high-voltage pulse to discharge lamp 4 in a start-up period, a pair of lamp voltage detecting resistances 33 and 34 which detects a lamp voltage applied on discharge lamp 4, and a lamp current detecting resistance 35 which detects a lamp current flowing through discharge lamp 4.

Discharge lamp control apparatus 3 further comprises a lamp power calculating circuit 36 which calculates a lamp power based on a lamp voltage detected by lamp voltage detecting resistances 33 and 34 and a lamp current detected by lamp current detecting resistance 35. Lamp power calculating circuit 36 generates a control signal corresponding to thus obtained lamp power, and sends this control signal to a DC/DC converter drive circuit 37. DC/DC converter drive circuit 37 controls the switching operation of a power MOS transistor 312 of DC/DC converter 31 in response to the control signal supplied from lamp power calculating circuit 36.

DC/DC converter 31 comprises a flyback transformer 311, the above-described power MOS transistor 312, a rectifier diode 313 and a smoothing capacitor 314. Flyback transformer 311 has a primary winding 311*a* connected in series with battery 1 via lighting switch 2, and a secondary winding 311*b* connected in series with discharge lamp 4 via rectifier diode 313. Power MOS transistor 312 performs its switching operation in response to the output of DC/DC converter drive circuit 37 so as to control an electric current flowing through primary winding 311*a* of flyback transformer 311. Rectifier diode 313 rectifies AC power, when generated from secondary winding 311*b* of flyback transformer 311, into DC power. Smoothing capacitor 314 produces a smoothed DC power.

In the above-described conventional discharge lamp control apparatus 3, there is a possibility that an inadequate ground fault may happen when a positive terminal 4*a* of discharge lamp 4 is accidentally brought into contact with a vehicle body, stopping current flow to discharge lamp 4 and disabling discharge lamp 4.

In view of the above, it is desirable that power supply to discharge lamp 4 is forcibly stopped in the event of the occurrence of such a ground fault.

Lamp power calculating circuit 36 honestly responds to such an erroneous power down. More specifically, in the event of ground fault of the positive terminal 4*a* of discharge lamp 4, lamp current detecting resistance 35 will detect that the lamp current is reduced to zero. In response to the reduction of lamp current, lamp power calculating circuit 36 continuously generates a control signal to DC/DC converter drive circuit 37 to increase the output of DC/DC converter 31 in such a manner that the lamp power restores its level to the before-grounding level. As a result, the output of DC/DC converter 31 will be increased extraordinarily.

In the same manner, in the above-described conventional discharge control apparatus 3, there is a possibility that an inadequate ground fault may happen when a negative terminal 4*b* of discharge lamp 4 is accidentally brought into contact with the vehicle body, although discharge lamp 4 maintains the lighting condition.

In response to the occurrence of such a ground fault, lamp power calculating circuit 36 operates in the same manner as in the above-described case. Namely, lamp current detecting resistance 35 will detect the lamp current reduced to zero in the event of such a ground fault of the negative terminal 4*b* of discharge lamp 4. To correct the reduction of lamp current, lamp power calculating circuit 36 continuously generates a control signal to DC/DC converter drive circuit 37 to increase the output of DC/DC converter 31 in such a manner that the lamp power restores its level to the before-grounding level. As a result, the output of DC/DC converter 31 will be increased extraordinarily.

Although not shown in the drawing, the above-described extraordinary increase of the output of DC/DC converter is also found even in a discharge lamp control apparatus for an AC-type lighting system in response to any ground fault of terminals of a discharge lamp, in the same manner as in the above-described lamp control apparatus for the DC-type lighting system.

SUMMARY OF THE INVENTION

Accordingly, in view of above-described problems encountered in the related art, a principal object of the present invention is to provide a novel and excellent control apparatus for a lighting system of a discharge lamp used in various types of vehicles, which is capable of suppressing the output of DC/DC converter in the event of the inadequate ground fault of the terminal of the discharge lamp, regardless of DC type or AC type of the lighting system.

In order to accomplish this and other related objects, a first aspect of the present invention provides a discharge lamp control apparatus comprising a DC/DC converter, a lamp current detecting resistance, a lamp voltage detecting resistance, a control circuit, and an excessive current detecting circuit. More specifically, the DC/DC converter boosts an output voltage of an electric power source and supplies a boosted voltage to a discharge lamp. The lamp current detecting resistance is connected in series with the discharge lamp to detect a lamp current flowing through the discharge lamp. The lamp voltage detecting resistance detects a lamp voltage applied to the discharge lamp. The control circuit controls an electric power of the DC/DC converter based on the lamp current detected by the lamp current detecting resistance and the lamp voltage detected by the lamp voltage detecting resistance. The excessive current detecting circuit detects an excessive current flowing through the lamp current detecting resistance. And, the discharge lamp and the lamp current detecting resistance are connected at a connecting point which is ground.

According to features of preferred embodiments of the present invention, the excessive current detecting circuit stops electric power supply to the discharge lamp in response to a detection of the excessive current. The excessive current detecting circuit inhibits the detection of excessive current until a predetermined period of time has elapsed after starting a lighting operation of the discharge lamp. It is also desirable that the above-described discharge lamp control apparatus further comprises an inverter converting a DC power of the DC/DC converter into an AC power.

A second aspect of the present invention provides a discharge lamp control apparatus comprising a DC/DC converter, an inverter, a lamp current detecting resistance, a lamp voltage detecting resistance, a control circuit, and an excessive current detecting circuit. More specifically, the DC/DC converter boosts an output voltage of an electric power source and supplies a boosted voltage to a discharge lamp. The inverter converts a DC power of the DC/DC converter into an AC power. The lamp current detecting resistance is connected in series with the discharge lamp to detect a lamp current flowing through the discharge lamp. The lamp voltage detecting resistance detects a lamp voltage applied to the discharge lamp. The control circuit controls an electric power of the DC/DC converter based on the lamp current detected by the lamp current detecting resistance and the lamp voltage detected by the lamp voltage detecting resistance. The excessive current detecting circuit detects an excessive current flowing through the lamp current detecting resistance. And, an input terminal of the inverter and the lamp current detecting resistance are connected at a connecting point which is ground.

According to features of the preferred embodiments of the present invention, the excessive current detecting circuit stops electric power supply to the discharge lamp in response to a detection of the excessive current. The excessive current detecting circuit inhibits the detection of excessive current until a predetermined period of time has elapsed after starting a lighting operation of the discharge lamp.

A third aspect of the present invention provides a discharge lamp control apparatus comprising a DC/DC converter, a lamp current detecting resistance, a lamp voltage detecting resistance, and a control circuit. More specifically, the DC/DC converter boosts an output voltage of an electric power source and supplies a boosted voltage to a discharge lamp. The lamp current detecting resistance is connected in series with the discharge lamp to detect a lamp current flowing through the discharge lamp. The lamp voltage detecting resistance detects a lamp voltage applied to the discharge lamp. The control circuit controls an electric power of the DC/DC converter based on the lamp current detected by the lamp current detecting resistance and the lamp voltage detected by the lamp voltage detecting resistance. The discharge lamp is activated by a negative voltage, while the discharge lamp is connected with the lamp current detecting resistance at a connecting point which is ground.

According to features of the preferred embodiments of the present invention, the discharge lamp control apparatus further comprises an excessive current detecting circuit for detecting an excessive current flowing through the lamp current detecting resistance. The excessive current detecting circuit stops electric power supply to the .discharge lamp in response to a detection of the excessive current. The excessive current detecting circuit inhibits the detection of excessive current until a predetermined period of time has elapsed after starting a lighting operation of the discharge lamp. The discharge lamp control apparatus further comprises an inverter converting a DC power of the DC/DC converter into an AC power.

A fourth aspect of the present invention provides a discharge lamp control apparatus comprising a DC/DC converter, an inverter, a lamp current detecting resistance, a lamp voltage detecting resistance, and a control circuit. More specifically, the DC/DC converter boosts an output voltage of an electric power source and supplies a boosted voltage to a discharge lamp. The inverter converts a DC power of the DC/DC converter into an AC power. The lamp current detecting resistance is connected in series with the discharge lamp to detect a lamp current flowing through the discharge lamp. The lamp voltage detecting resistance detects a lamp voltage applied to the discharge lamp. The control circuit controls an electric power of the DC/DC converter based on the lamp current detected by the lamp current detecting resistance and the lamp voltage detected by the lamp voltage detecting resistance. The discharge lamp is activated by a negative voltage, while an input terminal of the inverter is connected with the lamp current detecting resistance at a connecting point which is ground.

According to features of the preferred embodiments of the present invention, the discharge lamp control apparatus further comprising an excessive current detecting circuit for detecting an excessive current flowing through the lamp current detecting resistance. The excessive current detecting circuit stops electric power supply to the discharge lamp in response to a detection of the excessive current. The excessive current detecting circuit inhibits the detection of excessive current until a predetermined period of time has elapsed after starting a lighting operation of the discharge lamp.

Finally, a fifth aspect of the present invention provides a discharge lamp control apparatus comprising a DC/DC converter, a lamp current detecting resistance, a lamp voltage detecting resistance, and a control circuit. More specifically, the DC/DC converter boosts an output voltage of an electric power source and supplies a boosted voltage to a discharge lamp. The lamp current detecting resistance is connected in series with the discharge lamp to detect a lamp current flowing through the discharge lamp. The lamp voltage detecting resistance detects a lamp voltage applied to the discharge lamp. The control circuit controls an electric power of the DC/DC converter based on the lamp current detected by the lamp current detecting resistance and the lamp voltage detected by the lamp voltage detecting resistance, while stopping electric power supply to the discharge lamp when an excessive current is detected by the lamp current detecting resistance. And, the discharge lamp is connected with the lamp current detecting resistance at a connecting point which is grounded.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
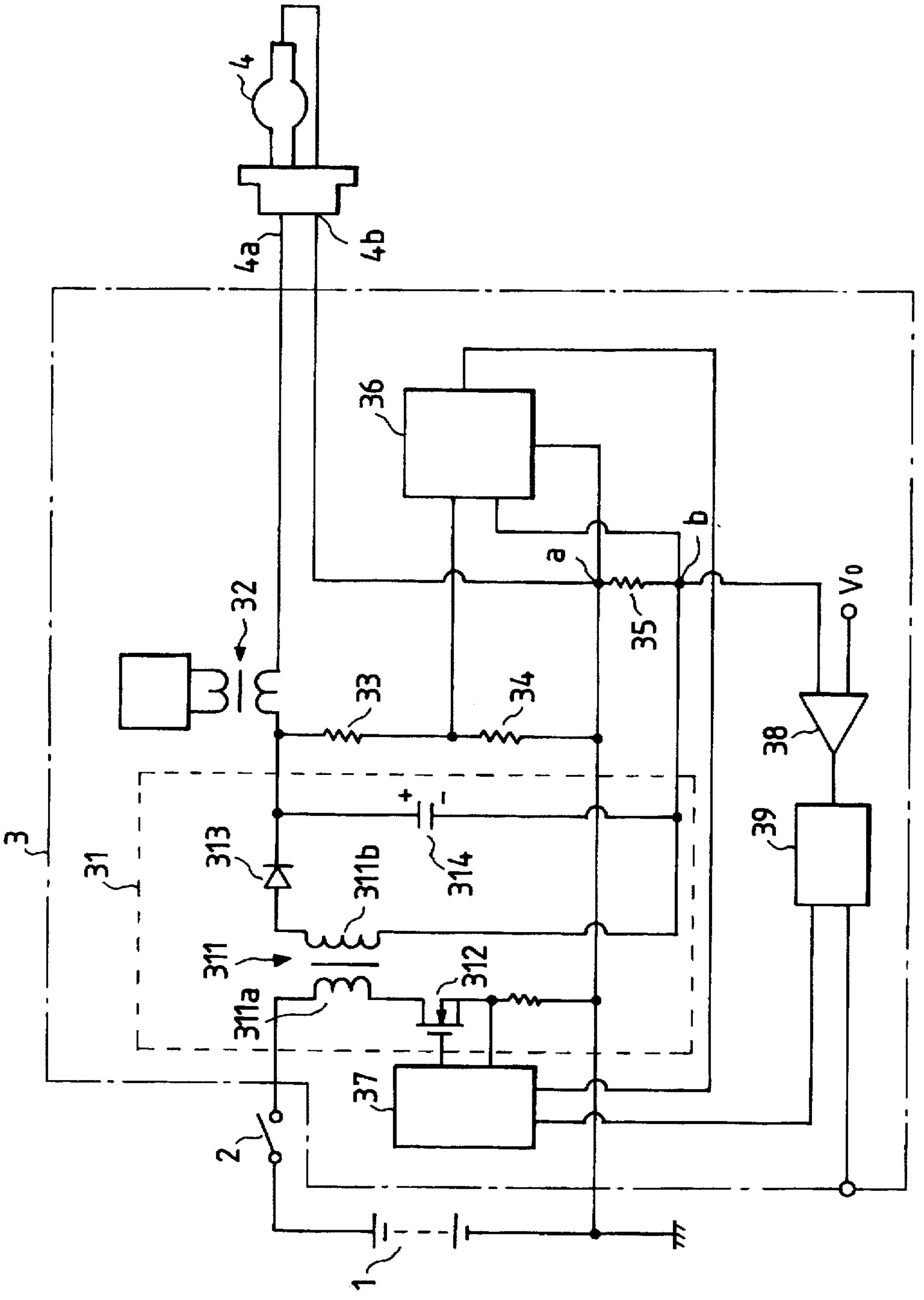
FIG. 1 is a circuit diagram showing a discharge lamp control apparatus for a DC-type lighting system in accordance with a first embodiment of the present invention.

Preferred embodiments of the present invention will be explained in greater detail hereinafter, with reference to the accompanying drawings. Identical parts are denoted by the same reference numeral throughout views.

First Embodiment

FIG. 1 is a circuit diagram showing a discharge lamp control apparatus for a DC-type lighting system in accordance with a first embodiment of the present invention.

In FIG. 1, reference numeral 1 represents a battery having a negative terminal grounded to a vehicle body. Reference numeral 2 represents a lighting switch. Reference numeral 3 represents a discharge lamp control apparatus. Reference numeral 4 represents a discharge lamp, such as a metal halide lamp, which is preferably used as a headlight for vehicles.

Discharge lamp control apparatus 3 comprises a DC/DC converter 31 which boosts 12 Volt of battery 1 to 300–500 Volt and supplies the boosted DC power to discharge lamp 4, a high-voltage generating circuit 32 which supplies a high-voltage pulse to discharge lamp 4 in a start-up period, a pair of lamp voltage detecting resistances 33 and 34 which detects a lamp voltage applied on discharge lamp 4, and a lamp current detecting resistance 35 which detects a lamp current flowing through discharge lamp 4.

Discharge lamp control apparatus 3 further comprises a lamp power calculating circuit 36 which calculates a lamp power based on a lamp voltage detected by lamp voltage detecting resistances 32 and 34 and a lamp current detected by lamp current detecting resistance 35. Lamp power calculating circuit 36 generates a control signal corresponding to thus obtained lamp power, and sends this control signal to a DC/DC converter drive circuit 37.

DC/DC converter drive circuit 37 controls the switching operation of a power MOS transistor 312 of DC/DC converter 31 in response to the control signal supplied from lamp power calculating circuit 36.

DC/DC converter 31 comprises a flyback transformer 311, the above-described power MOS transistor 312, a rectifier diode 313 and a smoothing capacitor 314. Flyback transformer 311 has a primary winding 311*a* connected in series with battery 1 via lighting switch 2, and a secondary winding 311*b* connected in series with discharge lamp 4 via rectifier diode 313. Power MOS transistor 312 performs its switching operation in response to the output of DC/DC converter drive circuit 37 so as to control an electric current flowing through primary winding 311*a* of flyback transformer 311. Rectifier diode 313 rectifies AC power, when generated from secondary winding 311*b* of flyback transformer 311, into DC power. Smoothing capacitor 314 produces a smoothed DC power.

Furthermore, the above-described discharge lamp control apparatus 3 of the first embodiment is characterized in that one end of lamp current detecting resistance 35 and discharge lamp 4 is connected at a connecting point "a" which is grounded. The other end (i.e. non-earth end) "b" of lamp current detecting resistance 35 is connected to one of two input terminals of a comparator 38. A predetermined reference voltage V0 is entered into the other input terminal of comparator 38.

In this first embodiment, comparator 38 acts as a means for detecting an excessive current by comparing the voltage of terminal "b" with the predetermined reference voltage V0. An output of comparator 38 is connected to an output circuit 39. Output circuit 39 forcibly stops the operation of DC/DC converter drive circuit 37 in response to the excessive current detected by comparator 38, as well as operates an alarm circuit (not shown) or the like.

A principal or fundamental operation of the discharge lamp control apparatus 3 shown in FIG. 1 will be explained hereinafter.

If an inadequate ground fault accidentally happens when a positive terminal 4*a* of discharge lamp 4 is brought into contact with the vehicle body, current flow to discharge lamp 4 will be stopped and discharge lamp 4 will be disabled in the same manner as described in the conventional discharge lamp control apparatus.

However, according to the first embodiment of the present invention, the one end of lamp current detecting resistance 35 and discharge lamp 4 is connected at the connecting point "a" which is grounded. Hence, the electric current continuously flows through lamp current detecting resistance 35 even after the ground fault happened.

For this reason, nonetheless the occurrence of inadequate ground fault, it is surely prevented that lamp power calculating circuit 36 erroneously calculates the lamp power as being reduced to zero. Accordingly, the output of DC/DC converter 31 is effectively restricted within an allowable range.

When the ground fault once happens, an excessive current flows through lamp current detecting resistance 35. The first embodiment of the present invention provides comparator 38 to detect such an excessive current. Detection of the excessive current is notified or sent to output circuit 39. In response to this notification, output circuit 39 forcibly stops the operation of DC/DC converter drive circuit 37, as well as actuating the alarm circuit or the like to surely notify a driver or passengers in the vehicle of the occurrence of hazardous ground fault.

On the other hand, similar ground fault will happen when a negative terminal 4*b* of discharge lamp 4 is brought into contact with the vehicle body. Even in such a case, discharge lamp control circuit 3 operates in the same manner as in the ordinary condition where no ground fault is caused, according to the arrangement of the first embodiment of the present invention characterized in that lamp current detecting resistance 35 and discharge lamp 4 are connected at the connecting point "a" which is surely grounded. Thus, it becomes possible to effectively suppress the output of DC/DC converter 31 in the event of the occurrence of ground fault.

Second Embodiment

Figure 2:
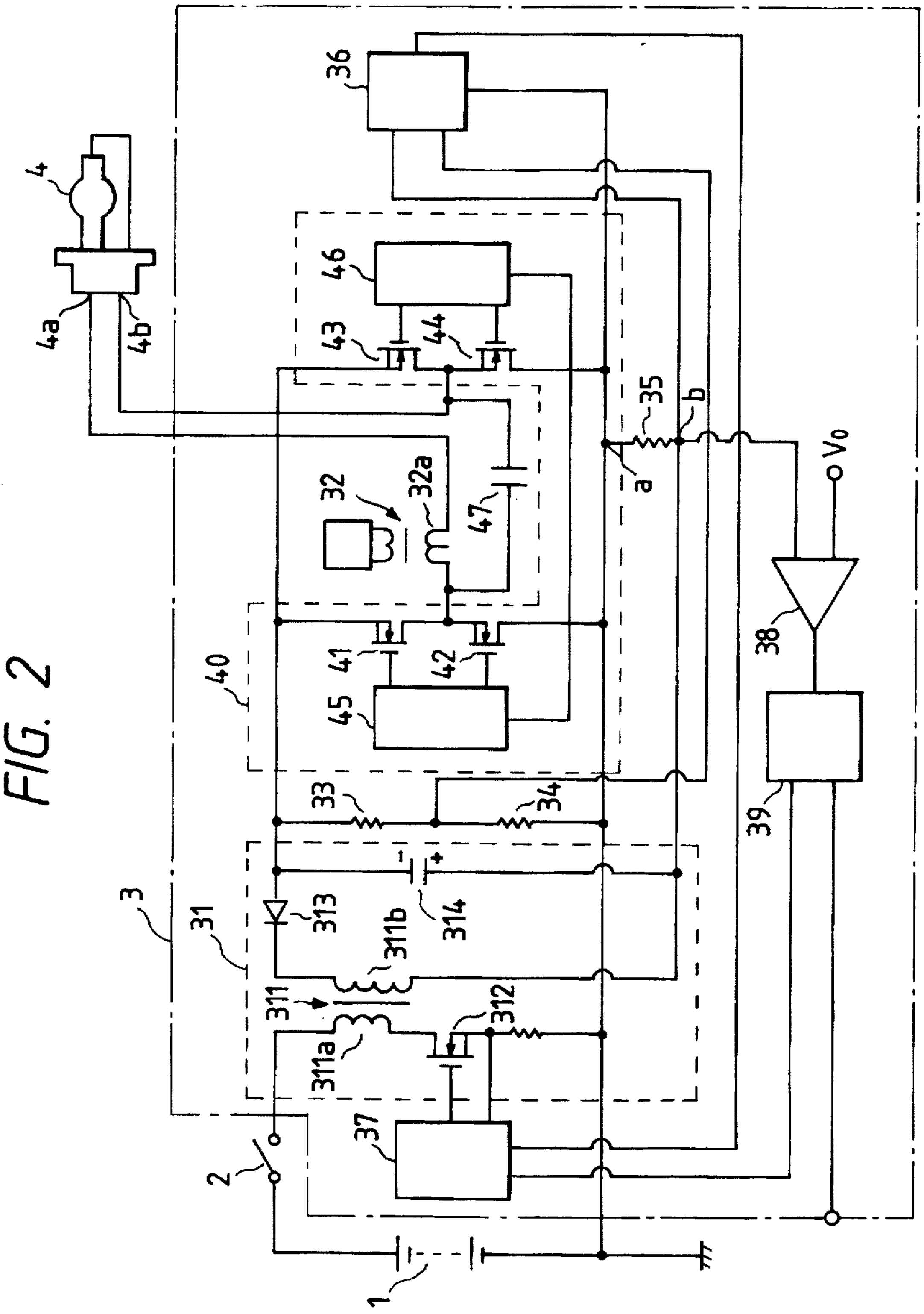
FIG. 2 is a circuit diagram showing a discharge lamp control apparatus for an AC-type lighting system (rectangular pulse lighting system) in accordance with a second embodiment of the present invention.

FIG. 2 is a circuit diagram showing a discharge lamp control apparatus for an AC-type lighting system (rectangular pulse lighting system) in accordance with a second embodiment of the present invention.

In FIG. 2, discharge lamp control apparatus 3 comprises an inverter 40 which converts the DC output of DC/DC converter 31 into AC output and supplies thus converted AC output to discharge lamp 4. Inverter 40 comprises power MOS transistors 41, 42, 43 and 44 constituting an H-bridge circuit, and two driver circuits 45 and 46. Driver circuits 45 and 46 are cooperative to alternately turn on or turn off the pair of power MOS transistors 41, 44 and the other pair of power MOS transistors 42, 43.

Furthermore, a capacitor 47 is added to the serial circuit comprising secondary winding 32*a* of high-voltage generating circuit 32 and discharge lamp 4, in such a manner that a closed circuit is formed by connecting capacitor 47 to the serial circuit. Capacitor 47 has a function of preventing a high-voltage pulse generated by secondary winding 32*a* in the start-up period from being applied on each of power MOS transistors 41–44, thereby effectively protecting the power MOS transistors 41–44 from the impulse of high-voltage pulse.

Furthermore, lamp current detecting resistance 35 is connected between the output terminal of DC/DC converter 31 and the input terminal of inverter 40. Lamp current detecting resistance 35 and the input terminal of inverter 40 are connected at connecting point "a" which is grounded. The other (non-earth) terminal "b" of lamp current detecting resistance 35 is connected to a cathode of a rectifier diode 313 via secondary winding 311*b*. Hence, the electric potential of the non-earth terminal "b" is maintained at a positive potential. Discharge lamp 4 is activated by a negative voltage.

The negative-voltage activation of discharge lamp 4 in accordance with the second embodiment of the present invention makes it possible to prevent sodium from leaking out of metal halide lamp 4, according to the well-known fact that the negative-voltage activation of metal halide lamp is effective to prevent the filler sodium from leaking out of the lamp bulb (i.e. loss of sodium).

Other arrangement of the second embodiment of the present invention is identical with the discharge lamp control apparatus 3 for the DC-type lighting system shown in FIG. 1.

When a ground fault happens when the terminals 4*a* or 4*b* of discharge lamp 4 is brought into contact with the vehicle body, the connecting point "a" comes to have the same electric potential as the ground-fault terminal 4*a* or 4*b*, because the connecting point "a" connecting lamp current detecting resistance 35 and the input terminal of inverter 40 is grounded.

Hence, a closed circuit is formed along a path connecting the one output terminal of DC/DC converter 31, lamp current, detecting resistance 35, connecting point "a", ground-fault terminal 4*a* or 4*b*, discharge lamp 4, the output terminal of inverter 40, the input terminal of inverter 40, and the other output terminal of DC/DC converter 31 (although discharge lamp 4 may not be included in some cases).

By the formation of such a closed circuit, an electric current continuously flows through lamp current detecting resistance 35 even after the ground fault happened.

For this reason, nonetheless the occurrence of inadequate ground fault, it is surely prevented that lamp power calculating circuit 36 erroneously calculates the lamp power as being reduced to zero. Accordingly, the output of DC/DC converter 31 is effectively restricted within an allowable range.

When the ground fault once happens, an excessive current flows through lamp current detecting resistance 35. The second embodiment of the present invention provides comparator 38 to detect such an excessive current. Detection of the excessive current is notified or sent to output circuit 39. In response to this notification, output circuit 39 forcibly stops the operation of DC/DC converter drive circuit 37, as well as actuating the alarm circuit or the like to surely notify a driver or passengers in the vehicle of the occurrence of hazardous ground fault. Furthermore, as lamp current detecting resistance 35 detects a positive voltage, signal processing in lamp power calculating circuit 36 and comparator 38 is fairly simplified.

Although lamp current detecting resistance 35 is interposed between the output of DC/DC converter 31 and the input terminal of inverter 40 in the second embodiment, substantially the same effect will be obtained by interposing lamp current detecting resistance 35 between the output terminal of inverter 40 and discharge lamp 4 so that a connecting point of lamp current detecting resistance 35 and discharge lamp 4 is grounded.

Third Embodiment

Figure 3:
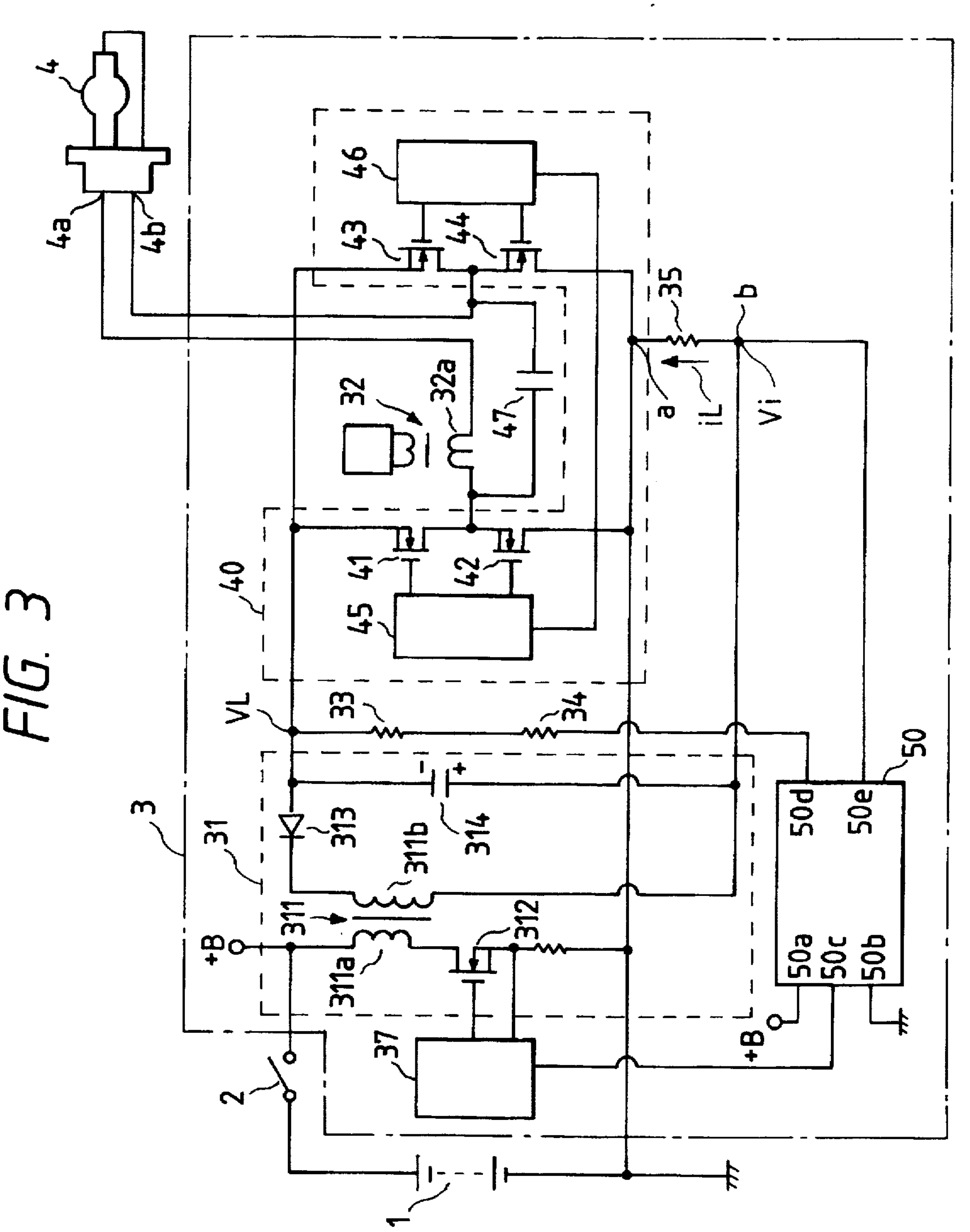
FIG. 3 is a circuit diagram showing a discharge lamp control apparatus for an AC-type lighting system in accordance with a third embodiment of the present invention.
Figure 4:
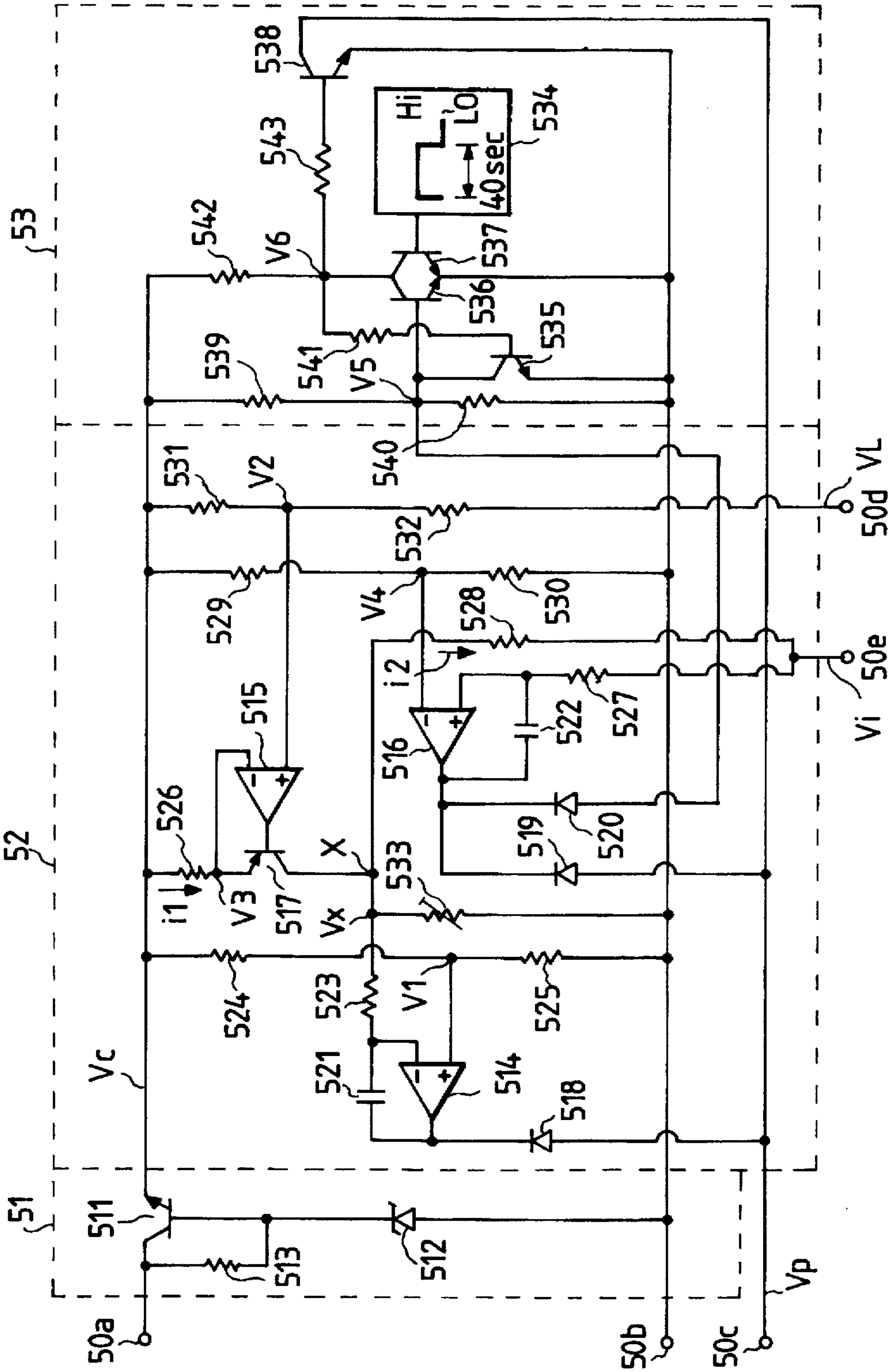
FIG. 4 is a circuit diagram showing the details of a power control circuit shown in FIG. 3.

FIG. 3 is a circuit diagram showing a discharge lamp control apparatus for an AC-type lighting system in accordance with a third embodiment of the present invention. FIG. 4 is a circuit diagram showing the details of a power control circuit shown in FIG. 3.

In FIG. 3, reference numeral 50 represents a power control circuit including an excessive current detecting circuit. Reference numerals 50*a* and 50*b* represent electric power input terminals which are connected via lighting switch 2 to a battery 1 mounted on a vehicle. Reference numeral 50*c* represents a power control output terminal which is connected to DC—DC converter drive circuit 37. Reference numeral 50*d* represents a lamp voltage detecting terminal which is connected to capacitor 314. Reference numeral 50*e* represents a lamp current detecting terminal which is connected to the non-earth terminal "b" of lamp current detecting resistance 35.

Power control circuit 50 comprises a constant-voltage circuit 51, a lamp power calculating circuit (DC/DC converter control circuit) 52 and an excessive current detecting circuit 53, as shown in FIG. 4

(1) Constant-voltage Circuit

Constant-voltage circuit 51 comprises a transistor 511, a constant-voltage diode 512 and a resistance 513. Constant-voltage circuit 51 has a function of converting the voltage of vehicle battery 1 into a constant voltage Vc.

(2) Lamp Power Calculating Circuit

Lamp power calculating circuit 52 comprises, as circuit elements, a plurality of operational amplifiers 514 through 516, a transistor 517, a plurality of diodes 518 through 520, capacitors 521, 522, numerous resistances 523 through 532, and a power adjusting resistance 533. Lamp power calculating circuit 52 comprises, as functional means, an error amplification means, a lamp voltage detecting means, a lamp current detecting means, and a lamp current restricting means.

(i) Error Amplification Means

In the lamp power calculating circuit 52, operational amplifier 514, capacitor 521 and resistances 523 through 525 cooperatively constitute the error amplification means. An electric potential V1 of the non-inverting input terminal of operational amplifier 514 is a reference potential obtained by dividing constant voltage Vc by voltage divider resistances 524 and 525.

Operational amplifier 514 generates a voltage proportional to a potential difference between the reference voltage V1 of operational amplifier 514 and an electric potential Vx of a summing point X inputted from the inverting input terminal.

DC/DC converter drive circuit 37, connected to operational amplifier 514 via diode 518, controls the switching operation of power MOS transistor 312 in response to the ON-OFF duty ratio determined by the output voltage of operational amplifier 514.

Primary current, whose magnitude is responsive to the switching operation of power MOS transistor 312, flows through primary winding 311*a* of flyback transformer 311. Secondary winding 311*b* generates an electric power proportional to the primary current. The electric power thus produced is supplied to discharge lamp 4. As a result, operational amplifier 514 functions in such a manner that the potential Vx of the summing point X is maintained at the reference potential V1.

(ii) Lamp Voltage Detecting Means

Operational amplifier 515, resistances 531, 532 and transistor 517 and resistance 526 cooperatively constitute the lamp voltage detecting means. In the lamp voltage detecting means, an electric potential V2 of the non-inverting terminal of operational amplifier 515 is equivalent to a value obtained by dividing a potential difference between the constant voltage Vc and lamp voltage VL by voltage divider resistances 531 and 532. Lamp voltage VL represents an electric potential of lamp voltage detecting terminal 50*d* which is a negative value. An electric potential V3 of the inverting input terminal of operational amplifier 515 is identical with the electric potential V2 of the non-inverting input terminal.

Accordingly, when the lamp voltage VL is increased in the negative direction, the potential V2 is reduced. In accordance with this reduction of potential V2, the potential V3 is reduced correspondingly. Current i1, flowing into summing point X via resistance 526, is increased.

On the other hand, when the lamp voltage VL is decreased in the negative direction, the potential V2 is increased. In accordance with this increase of potential V2, the potential V3 is increased correspondingly. Current i1, flowing into summing point X via resistance 526, is reduced.

In this manner, the lamp voltage detecting means increases the current i1 flowing into summing point X when lamp voltage VL is increased in the negative direction, and decreases the current i1 flowing into summing point X when lamp voltage VL is decreased in the negative direction.

(iii) Lamp Current Detecting Means

Resistance 528 serves as the lamp current detecting means. When lamp current iL is increased, an electric potential Vi of lamp current detecting terminal 50*e* is increased. In response to the increase of potential Vi, current i2 flowing from the summing point X to resistance 528 is reduced.

On the other hand, when lamp current iL is reduced, electric potential Vi of the lamp current detecting terminal 50*e* is reduced. In response to the reduction of potential Vi, current i2 flowing from summing point X to resistance 528 is increased.

In this manner, the lamp current detecting means increases the current i2 flowing from summing point X when lamp current iL is increased, and decreases the current i2 flowing from summing point X when lamp current iL is decreased.

(iv) Lamp Current Restricting Means

Operational amplifier 516, capacitor 522, resistances 527, 529, 530, and diodes 519, 520 cooperatively constitute the lamp current restricting means. In the lamp current restricting means, an electric potential V4 of the inverting input terminal of operational amplifier 516 is a reference potential obtained by dividing the constant potential Vc by voltage divider resistances 529 and 530. The non-inverting terminal of operational amplifier 516 is connected to lamp current detecting terminal 50*e* via resistance 527.

Operational amplifier 516 generates a High-level voltage when lamp current iL is small, because the electric potential Vi of lamp current detecting terminal 50*e* is lower than reference potential V4. Hence, via diode 519, the electric potential Vp of power control output terminal 50*c* is maintained at a High level. DC/DC converter drive circuit 37 is maintained in a High-output condition where the switching operation of power MOS transistor 312 is controlled by a large ON-OFF duty ratio so as to apply a high power to discharge lamp 4.

On the other hand, operational amplifier 516 generates a Low-level voltage when lamp current iL is large, because potential Vi of lamp current detecting terminal 50*e* is higher than reference potential V4. Hence, via diode 519, the potential Vp of power control output terminal 50*c* is maintained at a Low level. DC/DC converter drive circuit 37 is maintained in a Low-output condition where the switching operation of power MOS transistor 312 is controlled by a small ON-OFF duty ratio so as to apply a low power to discharge lamp 4.

In this manner, the lamp current restricting means applies a low power to discharge lamp 4 when lamp current iL is large, thereby restricting the lamp current iL.

In addition to the above-described function of restricting lamp current iL, the lamp current restricting means has a function of detecting an excessive current in accordance with a ground fault. More specifically, when an excessive current is generated in response to the ground fault, potential Vi of lamp current detecting terminal 50*e* exceeds reference voltage V4. Therefore, operational amplifier 516 generates a Low-level voltage. With this Low-level voltage, via diode 520, potential V5 of excessive current detecting circuit 53 (later described) is reduced to a Low-level potential. In response to this potential reduction, excessive current detecting circuit 53 maintains the electric potential Vp of power control output terminal 50*c* at zero level so as to stop the operation of DC/DC converter drive circuit 37.

(3) Excessive Current Detecting Circuit

Excessive current detecting circuit 53 comprises, as circuit elements, a timer circuit 534, transistors 535 through 538, and resistances 539 through 543. Excessive current detecting circuit 53 comprises, as functional means, a time detecting means, a DC/DC converter drive circuit disabling means, and an output holding means.

(i) Time Detecting Means

Timer circuit 534 serves as the time detecting means. Timer circuit 534 generates a High-level voltage for a predetermined period of time, e.g. 40 seconds, after starting a lighting operation, i.e. after lighting switch 2 is turned on. After this predetermined period of time has passed, timer circuit 534 generates a Low-level voltage.

(ii) DC/DC Converter Drive Circuit Disabling Means

Transistors 536 through 538 and transistors 539, 540, 542, 543 constitute the DC/DC converter drive circuit disabling means. In the DC/DC converter drive circuit disabling means, transistor 537 is maintained in an ON condition until the above-described predetermined time has elapsed after starting the lighting operation, since timer circuit 534 continuously generates the High-level voltage during this period. An electric potential V6 is maintained at a Low level regardless of the ON or OFF condition of transistor 537. For this reason, transistor 538 is maintained in an OFF condition. Electric potential Vp of power control output terminal 50*c* can be maintained at a High-level potential.

Accordingly, even if potential V5 is reduced to the Low level and transistor 536 is turned off by the above-described lamp current restricting means, transistor 537 is maintained in the ON condition for the predetermined period of time after starting the lighting operation. Thus, transistor 538 is maintained in the OFF condition. Electric potential Vp of power control output terminal 50*c* can be maintained at the High level. Hence, DC/DC converter drive circuit 37 is maintained in an activated condition.

After the predetermined period of time has passed after starting the lighting operation, timer circuit 534 continuously generates the Low-level voltage. Transistor 537 is maintained in the OFF condition. If a ground fault happens and an excessive current flows in this condition, electric potential V5 is reduced to the Low level by the lamp current restricting means as described above, turning off transistor 536.

In this case, as transistor 537 is always turned off as described above, electric potential V6 becomes the High level and transistor 538 is turned on. Electric potential Vp of power control output terminal 50*c* is reduced to zero level. DC/DC converter drive circuit 37 is disabled. Hence, no electric power is supplied to discharge lamp 4.

(iii) Output Holding Means

Transistor 535 and resistance 541 cooperatively constitute the output holding means. In the output holding means, transistor 535 is turned on in response to the change of electric potential V6 to the high level in the event that the ground fault occurs after the predetermined period of time has passed after starting the lighting operation as described above.

With turning-on condition of transistor 535, transistor 536 is surely maintained in the OFF condition. Accordingly, DC/DC converter drive circuit 37 is surely maintained in the disabled condition. The disabled condition is continuously maintained unless lighting switch 2 is turned off.

Figure 5:
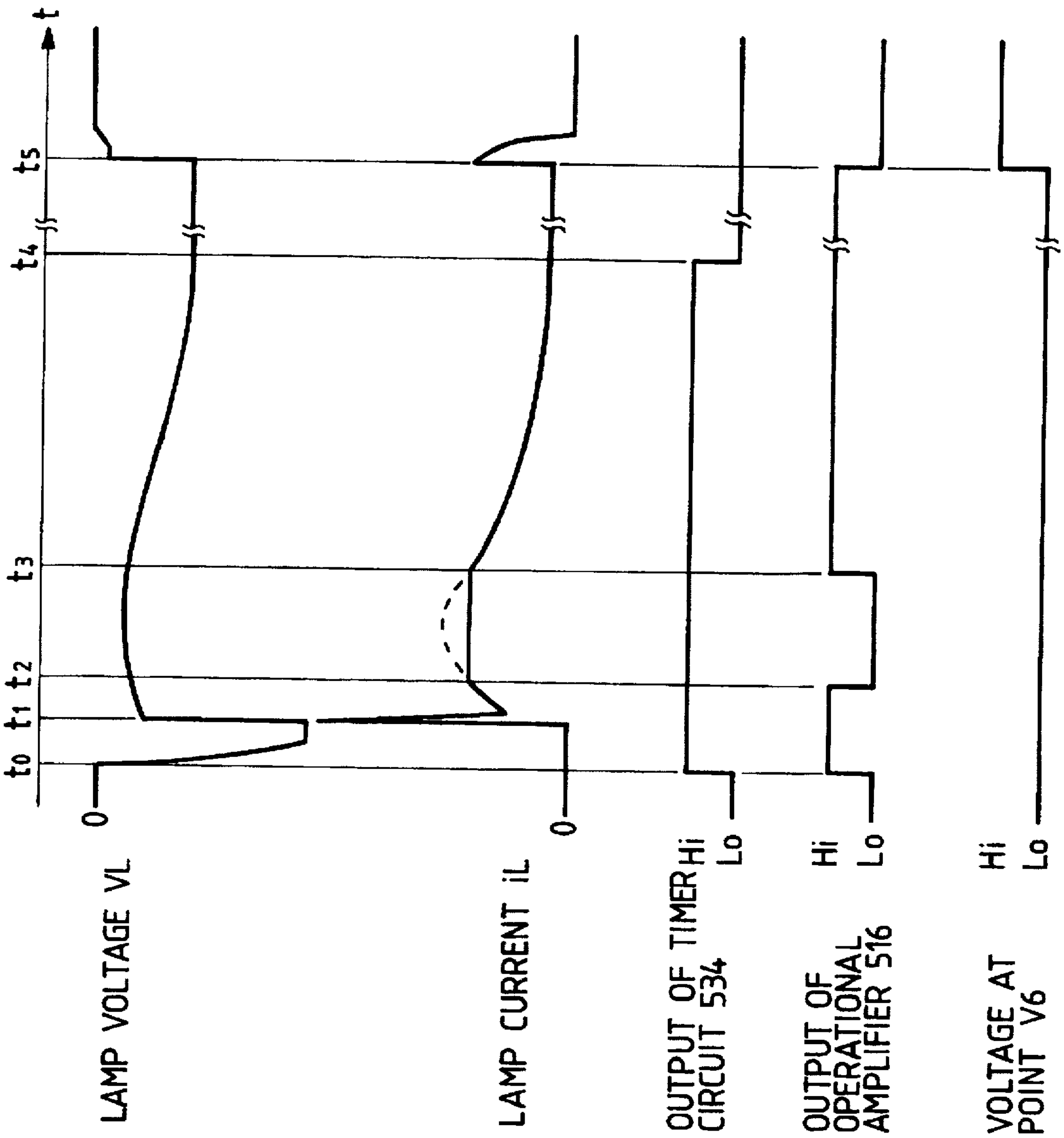
FIG. 5 is a graph showing signal or output changes in accordance with an operation of the power control circuit.
Figure 6:
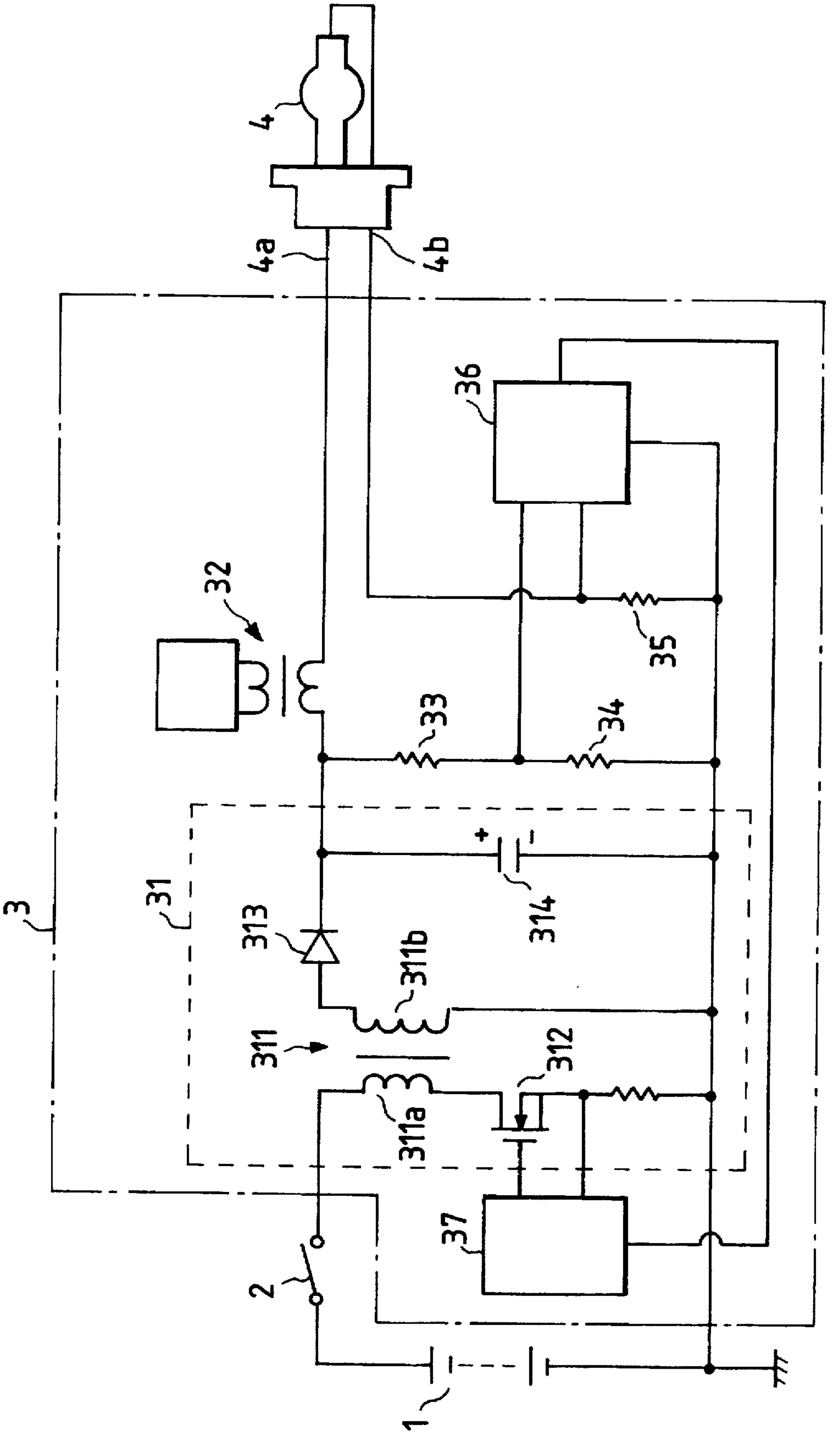
FIG. 6 PRIOR ART
FIG. 6 is a circuit diagram showing a conventional discharge lamp control apparatus.

Next, an essential operation of power control circuit 50 will be explained with reference to FIG. 5.

Once lighting switch 2 is turned on at time t0, timer circuit 534 continuously generates the High-level voltage until a predetermined time has elapsed at time t4. Therefore, during the period of time from time t0 to t4, transistor 537 is maintained in the ON condition, and potential V6 is maintained in the low level, and transistor 538 is maintained in the OFF condition, and potential Vp of power control output terminal 50*c* can be maintained at the High level. Thus, DC/DC converter drive circuit 37 is maintained in the activated condition.

Discharge lamp 4 starts discharge at time t1. During the period of time from t2 to t3, lamp current iL is excessively flowed, the output of operational amplifier 516 is changed to the Low-level, and electric potential Vp of power control output terminal 50*c* is changed to the Low level. Hence, DC/DC converter drive circuit 37 is maintained in the Low-output condition, so as to suppress the excessive current.

However, even if transistor 536 is turned off in response to the change of the output of operational amplifier 516 to the Low level, transistor 537 is maintained in the ON condition by timer circuit 534. Hence, electric potential Vp of power control output terminal 50*c* is not reduced to zero level in response to turn-on of transistor 538. Accordingly, DC/DC converter drive circuit 37 is not brought into the disable condition.

After time t4 has passed, a ground fault occurs at time t5. In response to this ground fault, operational amplifier 516 generates the Low-level voltage. Transistor 536 is turned on. At the moment of time t5, timer circuit 534 generates the Low-level voltage, turning off transistor 537. Accordingly, electric potential V6 is changed to the High level at the time t5. Transistor 538 is turned on. Electric potential Vp of power control output terminal 50*c* is reduced to zero level. DC/DC converter drive circuit 37 is disabled.

At this moment, transistor 535 is also turned on in response to the high-level potential of potential V6. Hence, transistor 536 is surely maintained in the OFF condition. Accordingly, transistor 538 is surely maintained in the ON condition. Electric potential Vp of power control output terminal 50*c* is surely maintained at zero level. DC/DC converter drive circuit 37 is surely maintained in the disabled condition. This disabled condition is continuously maintained unless lighting switch is turned off.

As explained in the foregoing description, the third embodiment of the present invention stops the power supply to discharge lamp 4 in response to the detection of excessive current once the predetermined period of time has elapsed after starting the lighting operation. Immediately after the lighting operation is started, there be generally found the phenomenon that lamp current iL is increased greatly due to the load resistance characteristics of discharge lamp 4. However, the present invention inhibits to detect the excessive current in such a region. Hence, it is surely prevented that the power supply to discharge lamp 4 from being erroneously stopped in this region. Furthermore, the lamp current restricting means (516) provided in the DC/DC converter control circuit (lamp power calculating circuit 52) can be used to detect the excessive current. Hence, no special circuit is additionally required for the detection of the excessive current.

It is possible in the arrangement of the first embodiment where discharge lamp 4 is actuated by DC voltage to actuate the discharge lamp 4 by a negative voltage by reversing the direction of the cathode of diode 313 as described in the second embodiment. With this arrangement, it becomes possible to prevent the filler sodium from leaking out of the lamp bulb.

Furthermore, connecting the discharge lamp and the lamp current detecting resistance at a grounded point makes it possible to obtain a positive current by the lamp current detecting resistance.

Moreover, it is possible in the first embodiment to provide the lamp current restricting means in the DC/DC converter control circuit in the same manner as in the third embodiment.

Yet further, it is also possible in the third embodiment to interpose the lamp current detecting resistance between the output terminal of the inverter and the discharge lamp and to connect the lamp current detecting resistance and the discharge lamp at a ground point.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A discharge lamp control apparatus comprising:

a DC/DC converter boosting an output voltage of an electric power source and supplying a boosted voltage to a discharge lamp;

a lamp current detecting resistance connected in series with said discharge lamp to detect a lamp current flowing through said discharge lamp;

lamp voltage detecting resistances detecting a lamp voltage applied to said discharge lamp;

a control circuit controlling an electric power of said DC/DC converter based on said lamp current detected by said lamp current detecting resistance and said lamp voltage detected by said lamp voltage detecting resistances;

an excessive current detecting circuit detecting an excessive current flowing through said lamp current detecting resistance; and said discharge lamp and said lamp current detecting resistance being connected at a connecting point which is ground.

2. The discharge lamp control apparatus in accordance with claim 1, wherein said excessive current detecting circuit stops electric power supply to said discharge lamp in response to a detection of the excessive current.

3. The discharge lamp control apparatus in accordance with claim 1, wherein said excessive current detecting circuit inhibits the detection of excessive current until a predetermined period of time has elapsed after starting a lighting operation of said discharge lamp.

4. The discharge lamp control apparatus in accordance with claim 1, further comprising an inverter converting a DC power of said DC/DC converter into an AC power.

5. A discharge lamp control apparatus comprising:

a DC/DC converter boosting an output voltage of an electric power source and supplying a boosted voltage to a discharge lamp;

an inverter converting a DC power of said DC/DC converter into an AC power;

a lamp current detecting resistance connected in series with said discharge lamp to detect a lamp current flowing through said discharge lamp;

lamp voltage detecting resistances detecting a lamp voltage applied to said discharge lamp;

a control circuit controlling an electric power of said DC/DC converter based on said lamp current detected by said lamp current detecting resistance and said lamp voltage detected by said lamp voltage detecting resistances;

an excessive current detecting circuit detecting an excessive current flowing through said lamp current detecting resistance; and an input terminal of said inverter and said lamp current detecting resistance being connected at a connecting point which is ground.

6. The discharge lamp control apparatus in accordance with claim 5, wherein said excessive current detecting circuit stops electric power supply to said discharge lamp in response to a detection of the excessive current.

7. The discharge lamp control apparatus in accordance with claim 5, wherein said excessive current detecting circuit inhibits the detection of excessive current until a predetermined period of time has elapsed after starting a lighting operation of said discharge lamp.

8. A discharge lamp control apparatus comprising:

a DC/DC converter boosting an output voltage of an electric power source and supplying a boosted voltage to a discharge lamp;

a lamp current detecting resistance connected in series with said discharge lamp to detect a lamp current flowing through said discharge lamp;

lamp voltage detecting resistances detecting a lamp voltage applied to said discharge lamp; and a control circuit controlling an electric power of said DC/DC converter based on said lamp current detected by said lamp current detecting resistance and said lamp voltage detected by said lamp voltage detecting resistances;

wherein said discharge lamp is activated by a negative voltage, while said discharge lamp is connected with said lamp current detecting resistance at a connecting point which is ground.

9. The discharge lamp control apparatus in accordance with claim 8, further comprising an excessive current detecting circuit detecting an excessive current flowing through said lamp current detecting resistance.

10. The discharge lamp control apparatus in accordance with claim 9, wherein said excessive current detecting circuit stops electric power supply to said discharge lamp in response to a detection of the excessive current.

11. The discharge lamp control apparatus in accordance with claim 9, wherein said excessive current detecting circuit inhibits the detection of excessive current until a predetermined period of time has elapsed after starting a lighting operation of said discharge lamp.

12. The discharge lamp control apparatus in accordance with claim 9, further comprising an inverter converting a DC power said DC/DC converter into an AC power.

13. A discharge lamp control apparatus comprising:

a DC/DC converter boosting an output voltage of an electric power source and supplying a boosted voltage to a discharge lamp;

an inverter converting a DC power of said DC/DC converter into an AC power;

a lamp current detecting resistance connected in series with said discharge lamp to detect a lamp current flowing through said discharge lamp;

lamp voltage detecting resistances detecting a lamp voltage applied to said discharge lamp; and a control circuit controlling an electric power of said DC/DC converter based on said lamp current detected by said lamp current detecting resistance and said lamp voltage detected by said lamp voltage detecting resistances;

wherein said discharge lamp is activated by a negative voltage, while an input terminal of said inverter is connected with said lamp current detecting resistance at a connecting point which is ground.

14. The discharge lamp control apparatus in accordance with claim 13, further comprising an excessive current detecting circuit detecting an excessive current flowing through said lamp current detecting resistance.

15. The discharge lamp control apparatus in accordance with claim 13, wherein said excessive current detecting circuit stops electric power supply to said discharge lamp in response to a detection of the excessive current.

16. The discharge lamp control apparatus in accordance witch claim 13, wherein said excessive current detecting circuit inhibits the detection of excessive current until a predetermined period of time has elapsed after starting a lighting operation of said discharge lamp.

17. A discharge lamp control apparatus comprising:

a DC/DC converter boosting an output voltage of an electric power source and supplying a boosted voltage to a discharge lamp;

a lamp current detecting resistance connected in series with said discharge lamp to detect a lamp current flowing through said discharge lamp;

lamp voltage detecting resistances detecting a lamp voltage applied to said discharge lamp; and a control circuit controlling an electric power of said DC/DC converter based on said lamp current detected by said lamp current detecting resistance and said lamp voltage detected by said lamp voltage detecting resistances, while stopping electric power supply to said discharge lamp when an excessive current is detected by said lamp current detecting resistance, wherein said discharge lamp is connected with said lamp current detecting resistance at a connecting point which is grounded.

18. A discharge lamp control apparatus comprising:

a DC/DC converter boosting an output voltage of an electric power source and supplying a boosted voltage to a discharge lamp;

a lamp current detecting resistance connected in series with said discharge lamp to detect a lamp current flowing through said discharge lamp, said lamp current detecting resistance having one end connected to said discharge lamp and the other end connected to said DC/DC converter;

lamp voltage detecting resistances detecting a lamp voltage applied to said discharge lamp;

a control circuit controlling an electric power of said DC/DC converter based on said lamp current detected by said lamp current detecting resistance and said lamp voltage detected by said lamp voltage detecting resistances;

an excessive current detecting circuit detecting an excessive current flowing through said lamp current detecting resistance; and said one end of said lamp current detecting resistance is ground.

19. A discharge lamp control apparatus comprising:

a DC/DC converter boosting an output voltage of an electric power source and supplying a boosted voltage to a discharge lamp;

an inverter converting a DC power of said DC/DC converter in an AC power;

a lamp current detecting resistance connected in series with said discharge lamp to detect a lamp current flowing through said discharge lamp, said lamp current detecting resistance having one end connected to an input terminal of said inverter and the other end connected to said DC/DC converter;

lamp voltage detecting resistances detecting a lamp voltage applied to said discharge lamp;

a control circuit controlling an electric power of said DC/DC converter based on said lamp current detected by said lamp current detecting resistance and said lamp voltage detected by said lamp voltage detecting resistances;

an excessive current detecting circuit detecting an excessive current flowing through said lamp current detecting resistance; and said one end of said lamp current detecting resistance is ground.

20. A discharge lamp control apparatus comprising:

a DC/DC converter boosting an output voltage of an electric power source and supplying a boosted voltage to discharge lamp;

a lamp current detecting resistance connected in series with said discharge lamp to detect a lamp current flowing through said discharge lamp, said lamp current detecting resistance having one end connected to said discharge lamp and the other end connected to said DC/DC converter;

lamp voltage detecting resistances detecting a lamp voltage applied to said discharge lamp; and a control circuit controlling an electric power of said DC/DC converter based on said lamp current detected by said lamp current detecting resistance and said lamp voltage detected by said lamp voltage detecting resistances;

wherein said discharge lamp is activated by a negative voltage, and said one end of said lamp current detecting resistance is ground.

21. A discharge lamp control apparatus comprising:

a DC/DC converter boosting an output voltage of an electric power source and supplying a boosted voltage to a discharge lamp;

an inverter converting a DC power of said DC/DC converter into an AC power;

a lamp current detecting resistance connected in series with said discharge lamp to detect a lamp current flowing through said discharge lamp, said lamp current detecting resistance having one end connected to an input terminal of said inverter and the other end connected to said DC/DC converter;

lamp voltage detecting resistances detecting a lamp voltage applied to said discharge lamp; and a control circuit controlling an electric power of said DC/DC converter based on said lamp current detected by said lamp current detecting resistance and said lamp voltage detected by said lamp voltage detecting resistances;

wherein said discharge lamp is activated by a negative voltage, and said one end of said lamp current detecting resistance is ground.

22. A discharge lamp control apparatus comprising:

a DC/DC converter boosting an output voltage of an electric power source and supplying a boosted voltage to a discharge lamp;

a lamp current detecting resistance connected in series with said discharge lamp to detect a lamp current flowing through said discharge lamp, said lamp current detecting resistance having one end connected to said discharge lamp and the other end connected to said DC/DC converter;

lamp voltage detecting resistances detecting a lamp voltage applied to said discharge lamp; and a control circuit controlling an electric power of said DC/DC converter based on said lamp current detected by said lamp current detecting resistance and said lamp voltage detected by said lamp voltage detecting resistances, while stopping electric power supply to said discharge lamp when an excessive current is detected by said lamp current detecting resistance, wherein said one end of said lamp current detecting resistance is grounded.

* * * * *